United States Patent [19]

Hucker

[11] Patent Number: 4,547,843
[45] Date of Patent: Oct. 15, 1985

[54] MULTIPLE OUTPUT DC POWER SUPPLY

[75] Inventor: David J. Hucker, Rockford, Ill.

[73] Assignee: Sundstrand Corporation, Rockford, Ill.

[21] Appl. No.: 670,916

[22] Filed: Nov. 13, 1984

Related U.S. Application Data

[63] Continuation of Ser. No. 539,940, Oct. 7, 1983, abandoned.

[51] Int. Cl.[4] .............................................. H02M 7/55
[52] U.S. Cl. ........................................ 363/67; 363/85; 363/129; 323/267
[58] Field of Search ................. 363/67, 69, 70, 84, 363/85, 87, 128, 129; 323/267; 307/82

[56] References Cited

U.S. PATENT DOCUMENTS 3,815,014 6/1974 Davis et al. .......................... 323/20
4,177,389 12/1979 Schott .................................. 363/70
4,270,165 4/1981 Carpenter et al. .................... 307/82

FOREIGN PATENT DOCUMENTS 55-99615 7/1980 Japan ..................................... 363/85
2056199 3/1981 United Kingdom ................. 363/71
710033 1/1980 U.S.S.R. ............................... 363/65

Primary Examiner—Peter S. Wong
Assistant Examiner—Judson H. Jones
Attorney, Agent, or Firm—Wood, Dalton, Phillips Mason & Rowe

[57] ABSTRACT

A multiple output DC power supply having a single closed loop control system for two or more power amplifiers which provide matched DC outputs. The control system is responsive to the sum of the DC signals output from the power supply to derive an average error signal. A switching logic circuit compares signals representing the unregulated AC power driving the power amplifiers to a reference signal in order to generate a set of control signals for each of the amplifiers, the average error signal biasing the reference signal so as to vary the time of occurrence of the control signals and regulate the DC outputs.

8 Claims, 3 Drawing Figures

MULTIPLE OUTPUT DC POWER SUPPLY

This is a continuation of application Ser. No. 539,940 filed Oct. 7, 1983, now abandoned.

TECHNICAL FIELD

The present invention relates to a multiple output DC power supply and more particularly to a multiple output DC power supply having a simplified control system to provide two matched, regulated DC outputs.

BACKGROUND OF THE INVENTION

Known DC power supplies with multiple regulated outputs have been used in torpedo and aircraft applications. An aircraft power system, for example, may employ a multiple output DC power supply to provide two matched DC outputs to an inverter which is controlled to provide an AC output to supply power to the aircraft's loads.

Known multiple output DC power supplies typically include two power amplifiers, each of which is responsive to a source of unregulated AC power and a set of control signals for providing two DC outputs. Two independent closed loop control systems, one for each power amplifier, are typically employed to provide the control signals and regulate the DC outputs of the power amplifiers. Known multiple output power supplies employing two separate and independent control systems are typically complex and costly since the control circuitry and logic must be duplicated for each power amplifier.

DISCLOSURE OF THE INVENTION

In accordance with the present invention, the disadvantages of prior multiple output power supplies have been overcome. The multiple output power supply of the present invention employs a single closed loop control system for two power amplifiers which provide matched DC outputs.

The control system is responsive to the sum of the DC outputs from the power amplifiers to provide an average error signal. A switching logic circuit compares signals representing the unregulated AC power driving the amplifiers to a reference signal to generate a set of control signals for each of the amplifiers, the average error signal biasing the reference signal so as to vary the time of occurrence of the control signals and regulate the DC outputs.

Because duplication of the control and logic circuitry has been eliminated by the single closed loop control system, the multiple output DC power supply of the present invention is not as complex or as costly as prior known multiple output power supplies employing two independent control systems.

BEST MODE FOR CARRYING OUT THE INVENTION

Figure 1:
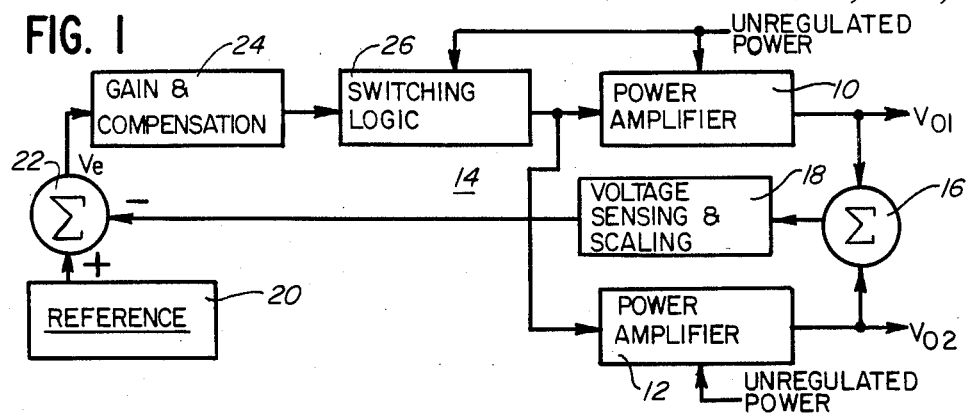
FIG. 1 is a block diagram of the multiple output DC power supply of the present invention.

The multiple output power supply as shown in FIG. 1 includes a pair of power amplifiers 10 and 12 which convert unregulated AC power into DC power to provide two DC outputs, $V_{O1}$ and $V_{O2}$. The DC outputs, $V_{O1}$ and $V_{O2}$, are regulated by a single closed loop control system, generally designated 14, in response to the average error of the DC outputs.

The power supply control system 14 includes a summer 16 which adds the DC outputs $V_{O1}$ and $V_{O2}$ to provide a signal representing the sum of the outputs. The signal output from the summer 16 is applied to a voltage sensing and scaling circuit 18 which scales the sum signal down to a controlled level so that it may be combined with a reference signal 20. The scaling circuit 18 may be a resistive voltage divider. The scaled sum signal output from the voltage sensing and scaling circuit 18 is applied to the negative input terminal of a summer 22. The summer 22 combines the scaled sum signal with the reference signal 20 which is applied to the positive input terminal of the summer, the reference signal 20 determining the output level of the power supply. The output of the summer 22 is a signal, $V_E$, representing the average error of the DC outputs from the power amplifiers 10 and 12. The average error signal $V_E$ is applied to a gain and compensation circuit 24 to establish a high steady state gain and to adjust the frequency response of the error signal. The circuit 24 may include an operational amplifier having feedback or a series connected resistor-capacitor network as well known in the art. A switching logic circuit 26, as discussed in detail below, is responsive to the average error signal output from the gain and compensation circuit 24 and the unregulated AC power applied to the power amplifiers 10 and 12 to generate a set of control signals which drive the power amplifiers.

Figure 2:
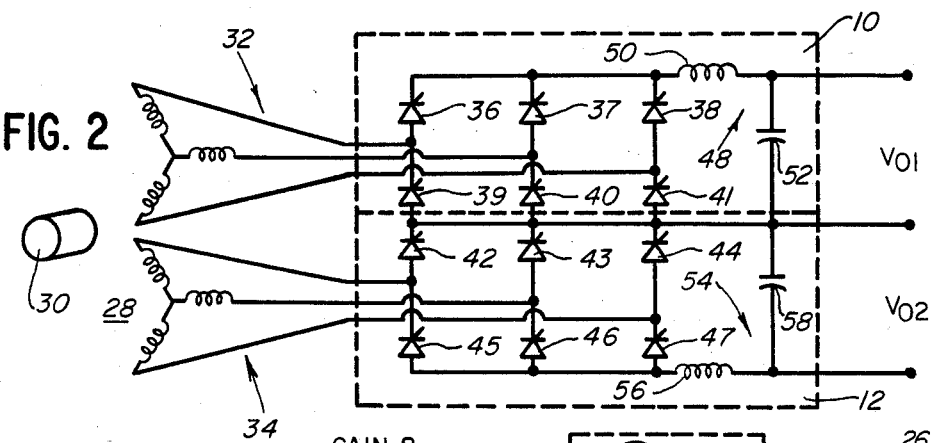
FIG. 2 is a schematic diagram of the power amplifiers of the multiple output DC power supply of FIG. 1.

As shown in FIG. 2, unregulated AC power is provided by a split generator, generally designated 28, having a rotor 30 and stator windings 32 and 34. Each of the stator windings 32 is coupled between a pair of silicon controlled rectifiers, SCRs, 36–41, forming the power amplifier 10 and each of the stator windings 34 is coupled between a pair of SCRs 42–47 forming the power amplifier 12. The power amplifiers 10 and 12 include respective output filters 48 and 54 formed of inductors 50, 56 and capacitors 52, 58 to provide smooth DC signals output from the amplifiers. The SCRs 36–47 are turned on by control signals from the switching logic circuit 26. The control signals are such that the following SCR pairs are turned on at the same time to provide matched DC outputs $V_{O1}$ and $V_{O2}$: SCRs 36 and 42, SCRs 37 and 43, SCRs 38 and 44, SCRs 39 and 45, SCRs 40 and 46, and SCRs 41 and 47.

Figure 3:
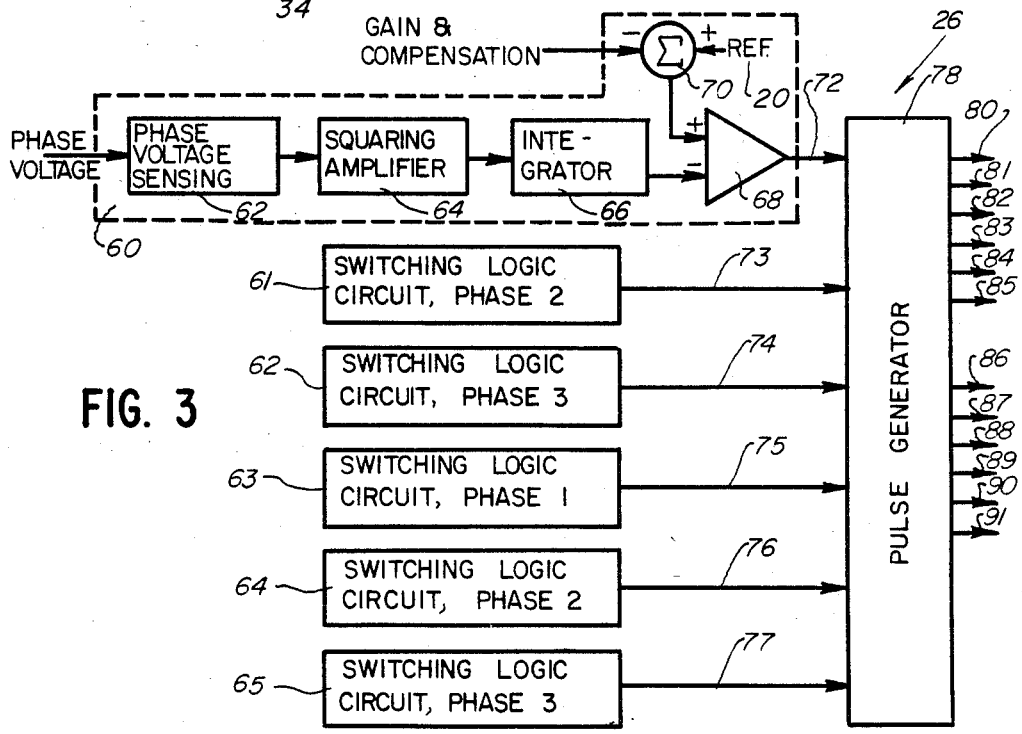
FIG. 3 is a block diagram of the switching logic circuit of the multiple output DC power supply of FIG. 1.

The switching logic circuit 26, as shown in FIG. 3, includes six logic circuits, 60–65, the circuits 60–62 each being responsive to a different phase of the stator windings 32, and the circuits 63–65 each being responsive to a different phase of the stator windings 34. The circuits 60–65 are identical except for the different phase voltages applied to each. Therefore, only one circuit, the circuit 60, will be discussed in detail. The logic circuit 60 includes a phase voltage sensing circuit 62 for sensing one phase voltage of the stator winding 32 and for scaling the phase voltage to a controlled level. The sensing circuit 62 may be a voltage divider. The output of the phase voltage sensing circuit 62 is applied to a squaring amplifier 64 to provide a constant amplitude square wave which is in phase with the unregulated phase voltage of the stator winding. The square wave output from the amplifier 64 is applied to an integrator 66 which, in response thereto, provides a ramp waveform. A comparator 68 compares the ramp waveform applied to the inverting input terminal of the comparator to a biased reference signal applied to the noninverting input terminal of the comparator to provide a trigger signal when the ramp waveform crosses the biased reference signal.

The biased reference signal applied to the comparator 68 is provided by a summer 70. The summer 70 combines the average error signal output from the gain and compensation circuit 24 and applied to the negative input terminal of the summer 70 with a reference signal which is equal to the reference signal 20 and applied to the positive input terminal of the summer. The average error signal biases the reference signal 20 to vary the point at which the ramp waveform output from the integrator 66 crosses over the reference signal applied to the noninverting input terminal of the comparator 68. The average error signal thus varies the time of occurrence of the trigger signal output from the comparator 68 so as to regulate the DC outputs $V_{01}$ and $V_{02}$ of the power amplifiers.

Each of the logic circuits 60-65 provides a timed trigger signal in response to the respective phase voltage applied thereto and the average error signal as discussed above with respect to the circuit 60. The set of trigger signals output from the logic circuits 60-65 initiate the generation of a set of control signals which are applied to the SCRs of the power amplifiers 10 and 12 to turn the SCRs on. The trigger signals output from the logic circuit on lines 72-77 are applied to a pulse generator 78 which in response thereto provides control signals on lines 80-85 which are applied to the respective SCRs 36-41 of the power amplifier 10. In response to the same set of trigger signals, the pulse generator 78 also provides control signals on lines 86-91 which are applied to the respective SCRs 42-47 of the power amplifier 12.

The control system 14, which regulates the DC outputs of the power amplifiers 10 and 12, eliminates duplication of the control circuitry for each power amplifier of a multiple output power supply. The power supply of the present invention is therefore not as complex or as costly as prior multiple output power supplies.

I claim:

1. In a DC power supply having first and second power amplifiers, each of which is responsive to an AC power source and a set of control signals to provide a regulated DC output, a simplified system for controlling said first and second power amplifiers to provide matched DC outputs comprising:

means for adding the regulated DC outputs from said first and second power amplifiers to provide a signal representing the sum thereof;

means for comparing said sum signal to a first reference signal to provide an error signal representing the difference between the sum and reference signals;

means responsive to said error signal for providing a set of control signals for each of said first and second power amplifiers.

2. The DC power supply of claim 1 wherein said means for providing the control signals includes means responsive to the AC power source for providing a set of trigger signals, said error signal varying the time of occurrence of said trigger signals; and means responsive to said set of trigger signals for generating a set of control signals for each of said first and second amplifiers.

3. The DC power supply of claim 1 wherein said AC power source is a multi-phase power source and said control means includes:

means responsive to each phase of the AC power source for generating a plurality of ramp waveforms, each ramp being in phase with a respective phase of the AC power;

means for combining the error signal and a second reference signal to provide a biased reference signal;

means for comparing said biased reference signal to each of said ramp waveforms to provide a set of trigger signals, each trigger signal associated with a respective phase of the AC power; and means responsive to said set of trigger signals for generating a set of control signals for said first and second power amplifiers.

4. The DC power supply of claim 3 wherein said comparing means provides a trigger signal when a ramp waveform exceeds the biased reference signal, the error signal biasing the second reference signal to vary the time of occurrence of the trigger signal.

5. The DC power supply of claim 3 wherein said first reference signal and the second reference signal are equal.

6. In a DC power supply having a plurality of power amplifiers, each of which is responsive to a set of control signals and a multi-phase AC power source for providing a regulated DC output, a simplified system for controlling said power amplifiers to provide matched DC outputs comprising:

means responsive to the regulated DC outputs of each of said power amplifiers for providing a signal representing the average error of the power supply outputs;

means responsive to the average error signal and each phase of the AC power source for providing a set of trigger signals;

means responsive to said set of trigger signals for generating a set of control signals for each of said power amplifiers.

7. The DC power supply of claim 6 wherein said means for providing the average error signal includes means for adding the regulated DC outputs of each of said power amplifiers to provide a signal representing the sum thereof;

means for comparing the sum signal to a reference signal to provide the average error signal representing the difference between the sum signal and the reference signal.

8. The DC power supply of claim 6 wherein said means for providing the trigger signals includes:

means responsive to each phase of the AC power source for providing a ramp waveform in phase with each phase of the AC power source;

means for combining the error signal with a reference signal to provide a biased reference signal; and means for comparing each ramp waveform to the biased reference signal to provide a trigger signal when the ramp waveform crosses the output signal, the average error signal biasing the reference signal to vary the crossover point of the ramp and the output signal.

* * * * *